(12) United States Patent
Rinzler et al.

(10) Patent No.: US 8,124,259 B2
(45) Date of Patent: Feb. 28, 2012

(54) ENHANCED ELECTRICAL CONTACT TO MICROBES IN MICROBIAL FUEL CELLS

(75) Inventors: Andrew G. Rinzler, Newberry, FL (US); Lonnie O'Neal Ingram, Gainesville, FL (US); Keelnatham T. Shanmugam, Gainesville, FL (US); Jonathan C. Moore, Gainesville, FL (US); Zhuangchun Wu, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 1053 days.

(21) Appl. No.: 11/577,395

(22) PCT Filed: Oct. 20, 2005

(86) PCT No.: PCT/US2005/037567
§ 371 (c)(1),
(2), (4) Date: Feb. 11, 2008

(87) PCT Pub. No.: WO2006/044954
PCT Pub. Date: Apr. 27, 2006

(65) Prior Publication Data
US 2008/0261083 A1 Oct. 23, 2008

Related U.S. Application Data

(60) Provisional application No. 60/620,594, filed on Oct. 20, 2004.

(51) Int. Cl.
*H01M 8/16* (2006.01)
*C12P 3/00* (2006.01)

(52) U.S. Cl. ............. 429/2; 429/401; 977/746; 435/168

(58) Field of Classification Search .............. 429/2, 401; 977/746; 435/168
See application file for complete search history.

(56) References Cited

U.S. PATENT DOCUMENTS 7,572,546 B2 * 8/2009 Karamanev .................. 429/101
2004/0101741 A1 5/2004 Minteer et al.

FOREIGN PATENT DOCUMENTS

EP 0247850 A1 12/1987

OTHER PUBLICATIONS

Cia et al. "Direct electron transfer of glucose oxidase promoted by carbon nanotubes", Analytical Biochemistry, (2004), vol. 332, pp. 75-83.
Karube et al. "Biochemical Fuel Cell Utilizing Immobilized Cells of Clostridium Butyricum", Biotechnology and Bioengineering, (1997), vol. XIX, pp. 1727-1733.

* cited by examiner

*Primary Examiner* — Rosanne Kosson
(74) *Attorney, Agent, or Firm* — Saliwanchik, Lloyd & Eisenschenk

(57) ABSTRACT

A microbial fuel cell (100) includes an anode compartment (110) including an anode (115) and anolyte (120). The anolyte (120) comprises a plurality of in-vivo cells (125) mixed with a plurality of electrically conducting nano or micro-scale fibers (128), wherein at least a portion of the plurality of electrically conducting fibers (128) are in electrical contact with a surface of the anode (115). A cathode compartment (140) includes a cathode (145) and a catholyte (150). A cation-exchange membrane (155) is disposed between the anode compartment (110) and the cathode compartment (140).

7 Claims, 6 Drawing Sheets

ENHANCED ELECTRICAL CONTACT TO MICROBES IN MICROBIAL FUEL CELLS

CROSS-REFERENCE TO RELATED APPLICATIONS

This application is the national stage entry of International Application No. PCT/US2005/037567, filed Oct. 20, 2005, which claims priority to U.S. Provisional Application No. 60/620,594, filed Oct. 20, 2004.

FIELD OF THE INVENTION

The invention relates to electrochemical cells including microbial fuel cells.

BACKGROUND OF THE INVENTION

The basic hydrogen PEM fuel cell consists of two catalyst-loaded electrodes separated by a proton exchange membrane (PEM). Molecular oxygen supplied to the catalytically active cathode is dissociated and reduced to $O^{2-}$ (an energetically favored process). Molecular hydrogen supplied to the anode is dissociated and the hydrogen atoms oxidized to protons ($H^+$), giving Up their electrons to the anode. Those electrons propagate through the external circuit to the cathode, delivering work in the process. The protons generated at the anode meanwhile diffuse through the PEM to combine with the reduced oxygen, producing water and heat as the waste products. Both the anode and cathode (in addition to the requirement that they be electrically conductive) are engineered with specific catalysts, commonly Pt, to facilitate the molecular dissociations and the respective electron transfers.

In a microbial fuel cell the anode need not be catalytically active, rather microbes in electrical communication with the anode are fed more complex fuels (e.g. carbohydrates such as glucose) that the microbes disassemble into protons in a series of reactions as part of their normal metabolic processes. Each proton extracted leaves behind an electron that is delivered to the anode and becomes available to do work as it traverses the external circuit. The protons meanwhile diffuse through the membrane to combine with reduced oxygen (generated at the cathode) as in the hydrogen PEM fuel cell. Microbial fuel cells have several advantages over conventional PEM fuel cells. Microbial fuel cells do not require pure molecular hydrogen as fuel and can use carbohydrate molecules which provide greater volumetric energy density as compared to molecular hydrogen. In addition, the anode need not be catalytically active which reduces cost since catalysts such as Pt commonly used as anode catalysts are expensive.

In hydrogen PEM fuel cells, the anode catalyst is in intimate electrical contact with the electrically conductive anode material being typically some form of conductive carbon resulting in low electrical impedance for electron transfer from the catalyst to the anode. For most microbial fuel cells, in contrast, the electrons are produced by metabolic processes inside the cell and must be transported across the high impedance cell membrane to the anode. Generally this is accomplished by molecules referred to as electron shuttling mediators. These are molecules that readily traverse the cell membrane, picking up electrons liberated within the cell and transporting them outside of the cell permitting passage to the anode through diffusion where their electronic charge is transferred.

Some microbial cells, in direct contact with the anode surface are able to transfer the electrons they generate directly to the anode. In either case a high surface area anode infiltrated with the microbial cells is beneficial. In the case of the direct electron transfer cells, because this maximizes the contact area with the electrode while in the case of electron shuttling mediators because this minimizes the distance over which the mediators must diffuse to transfer their charge to the anode.

Although microbial fuel cells have shown some promise, the slow transfer rate of electrons to the electrode has significantly limited power output of such fuel cells, and thus their commercial applicability. What is needed is a solution to significantly increase the transfer rate of electrons to the electrode to allow microbial fuel cells generate more power.

SUMMARY OF THE INVENTION

A microbial fuel cell includes an anode compartment including an anode and anolyte. The anolyte comprises a plurality of in-vivo cells mixed with a plurality of electrically conducting nano or micro-scale fibers, wherein at least a portion of the plurality of electrically conducting fibers are in electrical contact with a surface of the anode. A cathode compartment includes a cathode and a catholyte. A cation-exchange membrane is disposed between the anode compartment and the cathode compartment. As defined herein a "fiber" is a geometry which provides an aspect ratio of at least 10:1, and preferably at least 100:1, or more. The plurality of electrically conducting fibers can comprise electrically conductive carbon fibers, multi-wall carbon nanotubes or single wall carbon nanotubes, and mixtures thereof.

The catholyte can also comprises a plurality of electrically conducting nano or micro-scale fibers, wherein at least a portion of the plurality of electrically conducting fibers are in electrical contact with a surface of the cathode. The fuel cell can also include a bubbler for bubbling a gas through the anode compartment to increase turbulence therein. A redox mediator can be provided in the anode compartment. The plurality of electrically conducting nano or micro-scale fibers generally form an interconnected network, wherein the network in the anode compartment by virtue of the incidental percolating electrical contact between the fibers allows for growth of new in-vivo cells.

The invention can be applied generally beyond microbial fuel cells to provide improved electrochemical cells. An improved electrochemical cell comprises an anode, and a cathode, wherein at least one of the anode and cathode include a plurality of electrically conducting nano or micro-scale fibers, wherein at least a portion of the plurality of electrically conducting fibers are in electrical contact with a surface of the anode or the cathode. An ionic conducting medium is disposed between the anode and the cathode.

BRIEF DESCRIPTION OF THE DRAWINGS

There is shown in the drawings embodiments which are presently preferred, it being understood, however, that the invention can be embodied in other forms without departing from the spirit or essential attributes thereof.

DETAILED DESCRIPTION OF THE INVENTION

Figure 1:
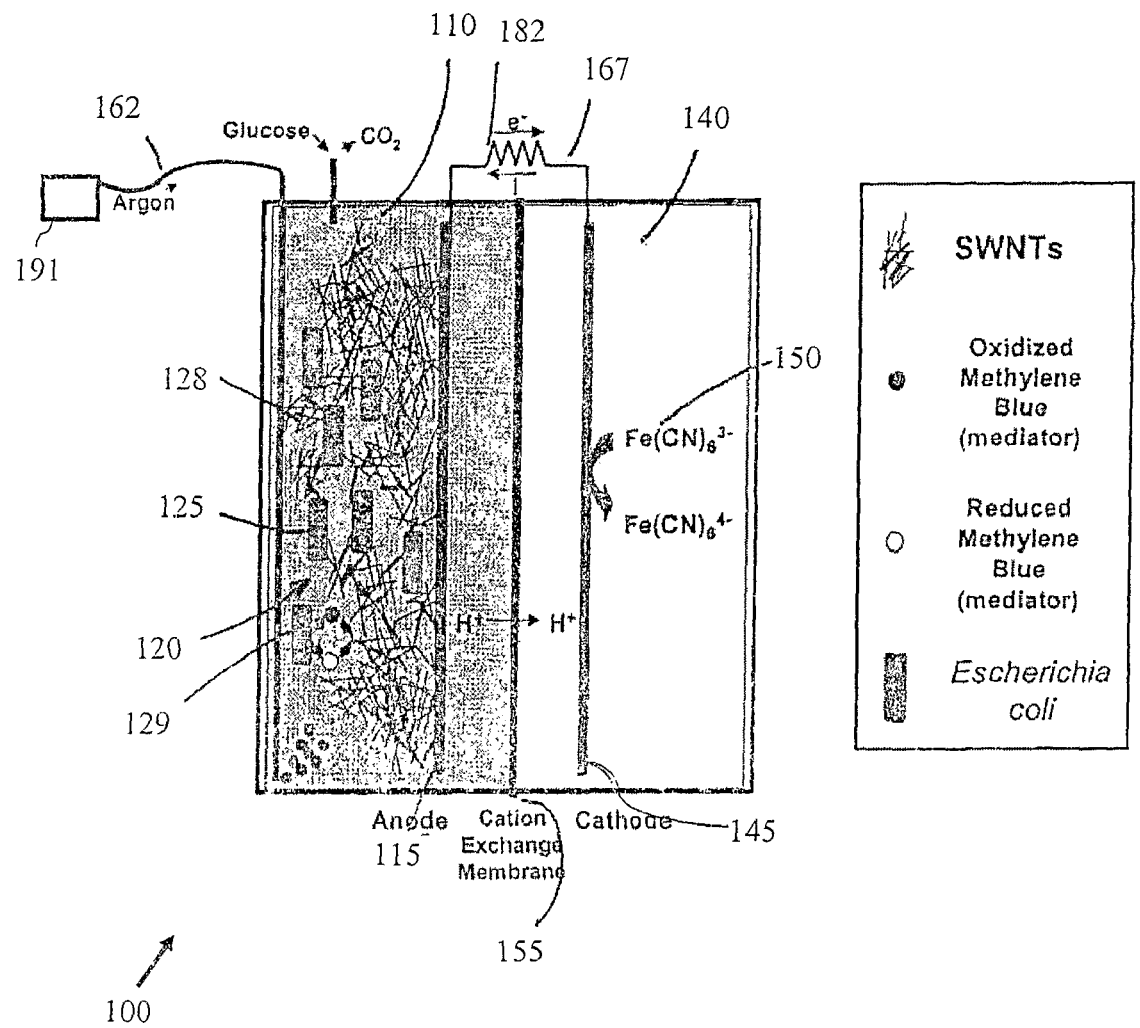
FIG. 1 shows a microbial fuel cell including an anode compartment which includes an anolyte comprising a plurality of in-vivo cells mixed with a plurality of electrically conducting nano or micro-scale fibers, according to an embodiment of the invention.

Referring to FIG. 1, an exemplary microbial fuel cell 100 is shown. Although a single fuel cell is shown, the invention can be embodied as a fuel cell stack comprising a plurality of fuel cells 100 which are stacked upon each other. The microbial fuel cell 100 includes an anode compartment 110 which includes an anode 115 and anolyte 120. The anolyte comprises a plurality of in-vivo cells 125 mixed with a plurality of electrically conducting nano or micro-scale fibers 128 and a mediator 129, such as methylene blue. At least a portion, and generally a majority, of the plurality of electrically conducting fibers 128 are in electrical contact with each other thus forming a fiber network. The fiber network is also in electrical contact with a surface of the anode 115. Thus, the effective surface area of the anode 115 is significantly increased by the fiber network.

A cathode compartment 140 includes a cathode 145 and a catholyte 150. The exemplary catholyte shown in FIG. 1 is the ferricyanide ion which is generally provided by an alkali ferricyanide, such as potassium ferricyanide. The ferricyanide ion readily reduces upon receipt of electrons from anode 115. Although not shown in FIG. 1, the catholyte 150 can be provided increased cathode surface area derived from the addition of the flexible interconnected network of nano/micro wires as described above relative to anolyte 120. A cation-exchange membrane 155 is disposed between the anode compartment 110 and the cathode compartment 140. The cells 125 shown in FIG. 1 comprise $E.\ Coli$ which generally require a mediator 129 for good performance. Other microbes which may be used with the invention, some of which do not require a mediator.

The cells 125 are shown being fed glucose in FIG. 1. More generally, organic waste can be used, preferably including carbohydrates. Fuel cell 100 is shown releasing $CO_2$ which is released when the fuel is digested by cells 125.

The fuel cell 100 includes a supply of an inert or unreactive gas 162, such as Ar, which is preferably bubbled through the anode compartment 110 by a bubbler 191. The turbulence provided by bubbling increases the efficiency of fuel cell 100.

The anode 115 is coupled to the cathode 145 using an electrically conductive wire 167. Electrons provided by cells 125 aided by mediator 129 are transferred by wire 167 to cathode 145, thus providing the ability to extract electrical power, such as across the resistor 182 shown in FIG. 1.

Significantly, the invention utilizes cells 125 mixed with high aspect ratio, electrically conductive fibers 128 rather than a conventional microbial fuel cell which includes an ultra high surface area, rigid anode that the cells must infiltrate. These fibers 128 can be electrically conductive carbon fibers, multi-wall carbon nanotubes, single wall carbon nanotubes or other electrically conducting nano or micro-scale wires or mixtures thereof. Single wall nanotubes (SWNTs) are shown in FIG. 1.

The concentration of these conductive fibers 128 provided is preferably sufficient to exceed the electrical percolation threshold putting the major fraction of these fibers 128 into electrical contact with each other and with the more remote surface of anode 115, and sufficient to surround the vast majority of cells 125 with an interconnected network of electrical conductors that effectively extend the anode surface to envelop nearly all microbial cells 125 in intimate proximity.

Nanotubes can be obtained in aqueous suspension using an non-ionic surfactant. The nanotubes can then be flocculated to form the electrically connected network. Flocculation can be effected via the addition of an acid, such as HCl, $HNO_3$, $H_2SO_4$, which disrupts the surfactant stabilized suspension. It has been found that such a network increases the maximum current output and corresponding power delivered by the microbial fuel cell 100. The loose but percolating nanotube or other fiber network also conveniently allows for growth of new cells, expanding as the cells divide. The conductive fibers 128 are preferably premixed with the microbial cells 125 when the fuel cell 100 is charged and if desired can be recovered from the purged microbial cell/conductive fiber mix, when the fuel cell 100 is recharged with fresh cells 125.

Although the invention is generally described herein relative to an improved microbial fuel cell based on an improved electrode design, the invention can be used to improve electrochemical processes in general. For example, certain chemical and biological systems can also benefit from the invention.

EXAMPLES

The present invention is further illustrated by the following specific examples, which should not be construed as limiting the scope or content of the invention in any way.

Example 1

A suspension of single-walled carbon nanotubes (SWNTs) was added to the anode compartment of a two chambered microbial fuel cell (MFC). The fuel cell included $Escherichia\ coli$ W3110 (ATCC 27325) as the electron donor in the anode compartment and methylene blue was used as the redox mediator.

The basic MFC assembly (NCBE, The University of Reading, UK) included Perspex (acrylic) chambers, neoprene gaskets, a carbon fiber anode and cathode (cut to 2.4 cm×3.3 cm) and a cation-exchange membrane (Nafion-117). Assembly of these components was performed as disclosed by the supplier and as described by Benetto (1990) $Biotechnology\ Education$ 1: 163-168. In addition, platinum wire (from Mini-Subcell GT electrophoresis apparatus electrodes, BioRad, Hercules, Calif.) was used to connect the carbon fiber anode and cathode to the external circuit, consisting of a 1000 ohm resistor and an ammeter (46-Range Digital Multimeter with PC interface and data-logging MeterView 1.0 software, RadioShack, Fort Worth, Tex.), in series. Argon was bubbled into the anode compartment using 1 mm outer diameter, 0.2 mm inner diameter PTFE tubing passing through the same aperture as the anode's platinum wire, down to the bottom of the chamber. This aperture was sealed to divert exiting gases to the feeding/ venting tube, located in the chamber's other aperture. The argon flow rate was maintained at approximately 3.5 ml/min., as measured at the venting tube using a J&W Scientific (Folsom, Calif.) ADM 2000 flow meter. The cathode chamber was modified in the same manner as the anode chamber, however, no gas was delivered to the cathode chamber and no efforts were made to seal the electrode aperture.

The catholyte (9 mL total volume added per MFC after assembly) included 50 mM potassium ferricyanide in 100 mM sodium phosphate buffer, pH 7.0. A cloth layer (75 percent rayon, 25 percent polyester, EasyWipe, Magla Products L.L.C., Morristown, N.J.) was used to separate the electrodes from the cation-exchange membrane in each chamber. Both assembled MFCs were attached to a weight, placed in a one gallon plastic freezer bag and immersed (to the top of the MFCs) in a 37° C. water bath.

*Escherichia coli* W3110 cultures were inoculated from a single colony on a mineral salts medium agar plate containing 50 mM 3-[N-morpholino]propane-sulphonic acid (MOPS) as a pH buffer, 166.5 mM (30 g/L) glucose, 3.5 g/L $KH_2PO_4$, 5 g/L $K_2HPO_4$, 3.5 g/L $(NH_4)_2HPO_4$, 1 mM $MgSO_4 7H_2O$, 0.1 mM $CaCl_2 2H_2O$, 0.015 mM thiamine-HCl, 1.6 mg/L $FeCl_3$, 0.2 mg/L $CoCl_2 6H_2O$, 0.1 mg/L $CuCl_2$, 0.2 mg/L $ZnCl_2 4H_2O$, 0.2 mg/L $NaMoO_4$, 0.05 mg/L $H_3BO_3$, 15 g/L agar into 50 ml of the mineral salts medium (same composition as plates, without agar) in a 250 ml baffled Erlenmeyer flask. The cultures were then incubated at 37° C., with shaking at 250 rpm, in an Innova 4000 incubator shaker (New Brunswick Scientific Co., Inc., Edison, N.J.). Upon reaching an optical density of 0.11 at 550 nm (approximately 36.3 mg dry cell weight/L), cells were harvested by centrifugation (10.9 mL of culture in each tube) in 30 mL centrifuge tubes, at 5000 rpm for 5 minutes at room temperature in a Beckman J2-21 centrifuge (JA-20 rotor). The supernatant was discarded and each pellet resuspended in 0.5 mL mineral salts medium containing 30 g/L glucose (as previously described).

The SWNT suspension to be used in the MFC was washed in the mineral salts medium to minimize carryover of detergent used in its preparation as well as to limit the dilution of medium components. To 3 mL of the SWNT suspension (0.06 mg/mL) was added 3 mL of medium, in a 13 mm×100 mm test tube. The tube was inverted to mix and spun down in a clinical centrifuge for two minutes. This caused aggregation of the SWNTs and they were transferred in a minimal volume (2 mL) to a fresh tube. To this tube was added an additional 4 mL of mineral salts medium. 2 mL of the SWNT wash was transferred to a fresh tube and 4 mL mineral salts medium added to it for the no-SWNT control MFC. The resuspended cells were added to each of these tubes and briefly gassed with argon, using a 25⅝ gauge needle on a 1 mL syringe with plunger removed and an argon-filled balloon on the other end. These suspensions were then transferred to the anode chamber of their respective MFCs using a 10 mL syringe equipped with an 18 gauge cannula. The final cell density in the anolytes was approximately 60 mg dry cell weight/L (0.18 $OD_{550}$). To each anode chamber was then added 480 μL of 10 mM methylene blue, by syringe.

Figure 2:
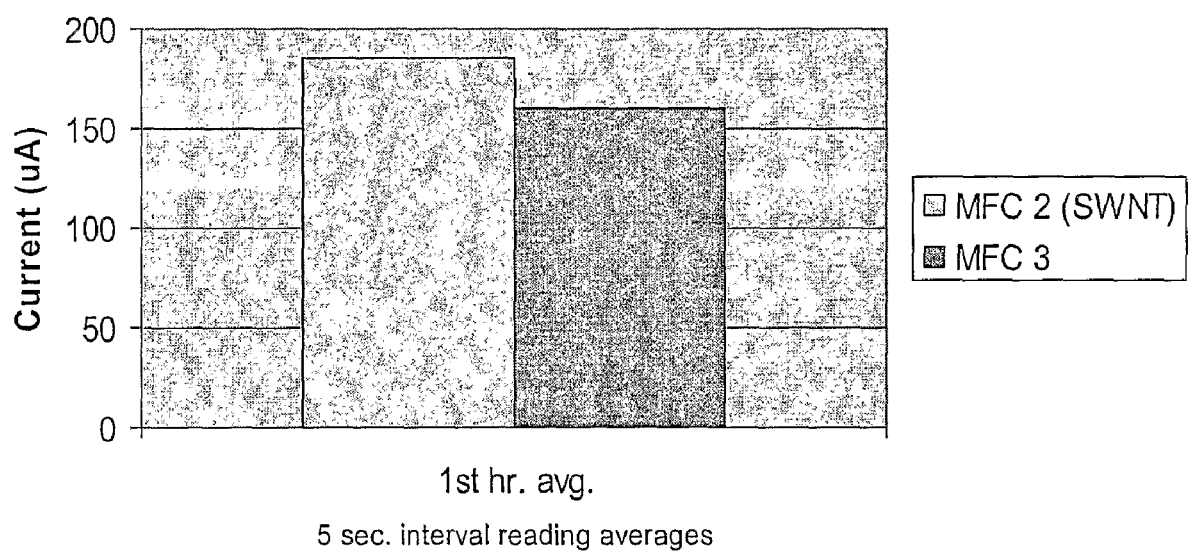
FIG. 2 shows the superior current performance of an exemplary SWNT MFC according to the invention as compared to a conventional no-SWNT MFC.

After addition of cells and mediator and after a brief current spike in which the no-SWNT MFC control surpassed that of the SWNT MFC, the SWNT MFC sustained a higher current as compared to the no-SWNT MFC as shown in FIG. 2. After approximately 7 hours, the SWNT MFC current dropped to the control level (~0.1 mA).

Figure 4:
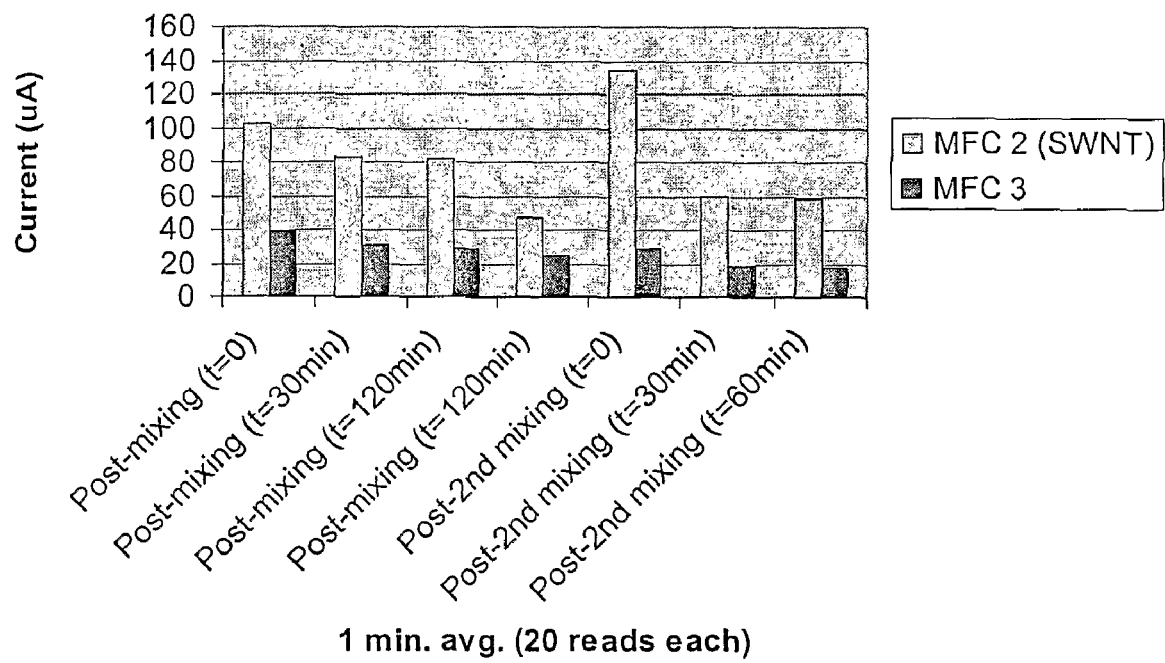
FIG. 4 shows results obtained after Ar flow was stopped 19 hours into the run to determine the current produced by each MFC in the absence of anolyte mixing as a function of post-mixing time.

Argon flow was stopped 19 hours into the run to determine the current produced by each MFC in the absence of anolyte mixing. These results are shown in FIG. 4. The SWNT MFC produced a current that was over 2.5 times greater than that of the no-SWNT control MFC. These current levels were stable for about 1.5 hours, at which point the SWNT MFC's current dropped to just under 2 times that of the control. Brief mixing with argon, performed 2 hours after this observed drop, greatly increased the SWNT MFC current and resulted in a stable 3-fold higher current for an additional 1.5 hours.

Figure 3:
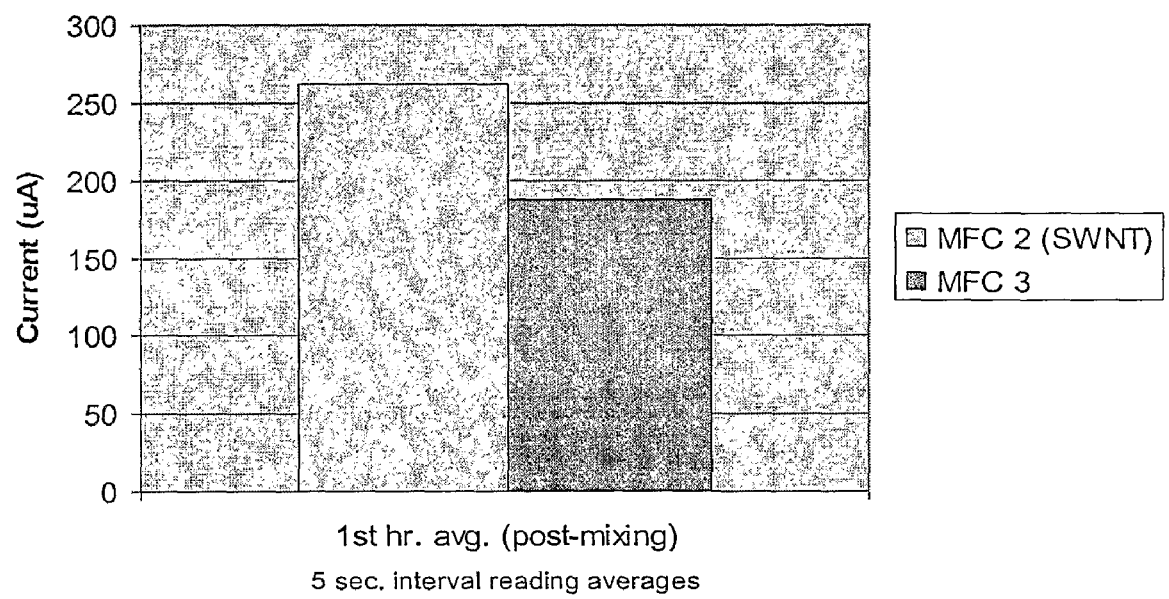
FIG. 3 shows results from an experiment in which argon mixing was halted soon after inoculation of the MFCs and addition of mediator. The SWNT MFC current was about 50 percent higher as compared to the control MFC.

A second experiment was performed in which argon mixing was halted soon after inoculation of the MFCs and addition of mediator. The same MFC setup procedure was followed as in the initial experiment. However, the inoculated anolyte cell density was slightly higher (~66 mg dry cell weight/L or 0.2 $OD_{550}$). The SWNT MFC current was about 50 percent higher as compared to the control MFC as shown in FIG. 3.

Example 2

Figure 5:
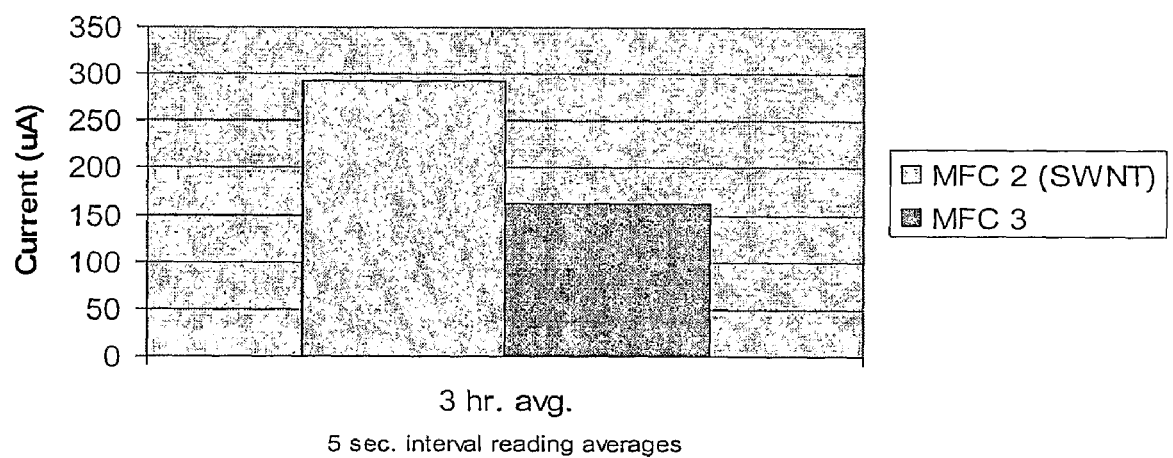
FIG. 5 shows the superior current performance of an exemplary carbon fiber MFC (CF-MFC) according to the invention as compared to a conventional MFC. The CF MFC was observed to produce a current that was nearly twice that of the control MFC.

Microbial fuel cells were set up as before, but a mixed length carbon fiber suspension was used to increase the effective anode surface area and to improve electron transfer efficiency. During the first trial it was found that the mixed carbon fibers could not be transferred by syringe as the SWNTs described in Example 1 were. This necessitated the feeding of the aggregated fibers through the feeding/vent tube in the anode chamber, after the addition of the cell suspension, prior to addition of mediator. This process was performed by pushing the fibers through the tube with toothpicks. Upon addition of all components, the carbon fiber MFC(CF MFC) was observed to produce a current that was nearly twice that of the control MFC as shown in FIG. 5.

Figure 6:
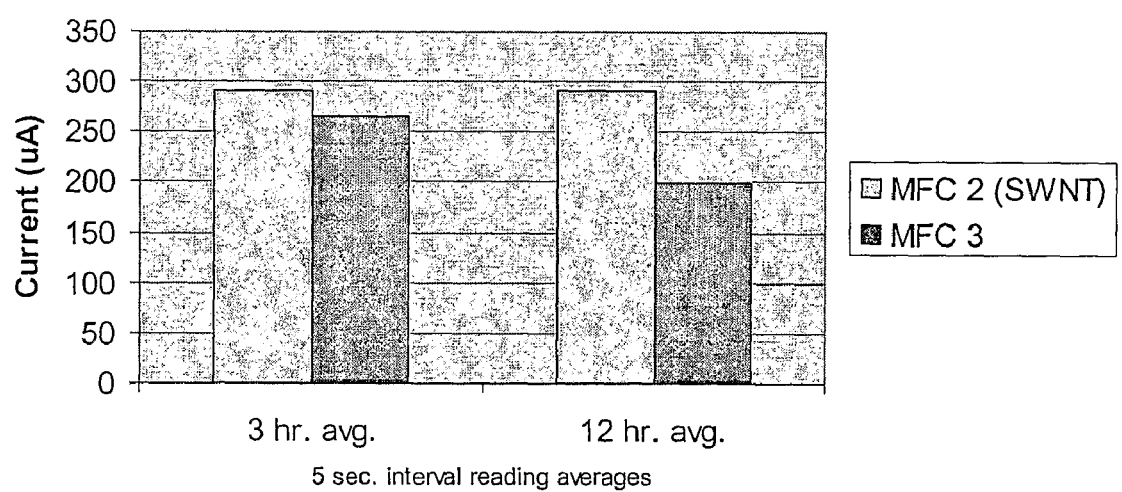
FIG. 6 shows the current obtained from a CF MFC according to the invention as compared to the control MFC after 3 and 12 hours, where the carbon fiber suspension was transferred as several aggregates from which most of the liquid had been removed to the anode compartment during assembly. After 12 hours the CF MFC produced a stable current that averaged at least 40 percent higher than that of the control MFC.

For the second trial with the CF-MFC, the carbon fiber suspension was transferred as several aggregates from which most of the liquid had been removed, to the anode compartment during assembly. *Escherichia coli* W3110 cells were resuspended as described for the other experiments, in 6.5 mL total volume mineral salts medium with 30 g/L glucose, for each MFC(CF MFC and control MFC). The cell suspensions were transferred to the MFC anode chambers, followed by addition of the mediator methylene blue. As shown in FIG. 6, initially, such as after 3 hours, current was only slightly higher from the CF MFC according to the invention as compared to the control MFC. However over a 12 hour period the CF MFC produced a stable current that averaged at least 40 percent higher than that of the control MFC.

This invention can be embodied in other forms without departing from the spirit or essential attributes thereof and, accordingly, reference should be had to the following claims rather than the foregoing specification as indicating the scope of the invention.

We claim:
1. A microbial fuel cell, comprising:
   (a) an anode compartment including an anode and anolyte, said anolyte comprising a plurality of microbial cells mixed with a plurality of loose percolating electrically conducting nano or micro-scale fibers, wherein at least a portion of said plurality of electrically conducting fibers are in electrical contact with a surface of said anode;
   (b) a cathode compartment comprising a cathode and a catholyte, and

(c) a cation-exchange membrane disposed between said anode compartment and said cathode compartment.

2. The microbial fuel cell of claim 1, wherein said catholyte comprises a plurality of electrically conducting nano or micro-scale fibers, wherein at least a portion of said plurality of electrically conducting fibers are in electrical contact with a surface of said cathode.

3. The microbial fuel cell of claim 1, wherein said plurality of electrically conducting fibers provide an average aspect ratio of at least 10.

4. The microbial fuel cell of claim 3, wherein said plurality of electrically conducting fibers comprise at least one selected from the group consisting of electrically conductive carbon fibers, multi-wall carbon nanotubes, single wall carbon nanotubes, and a mixture thereof.

5. The microbial fuel cell of claim 1, further comprising a bubbler for bubbling a gas through said anode compartment to increase turbulence therein.

6. The microbial fuel cell of claim 1, further comprising at least one redox mediator in said anode compartment.

7. The microbial fuel cell of claim 1, wherein said plurality of electrically conducting nano or micro-scale fibers form an interconnected network, and wherein said network in said anode compartment allows for growth of new microbial cells.

* * * * *